E. DETTELBACH.
TIRE.
APPLICATION FILED JUNE 17, 1910.
1,022,127.
Patented Apr. 2, 1912.
2 SHEETS—SHEET 2.
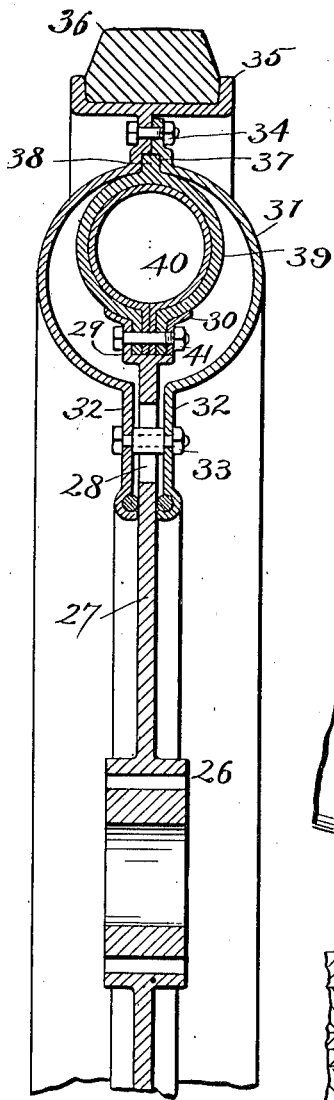
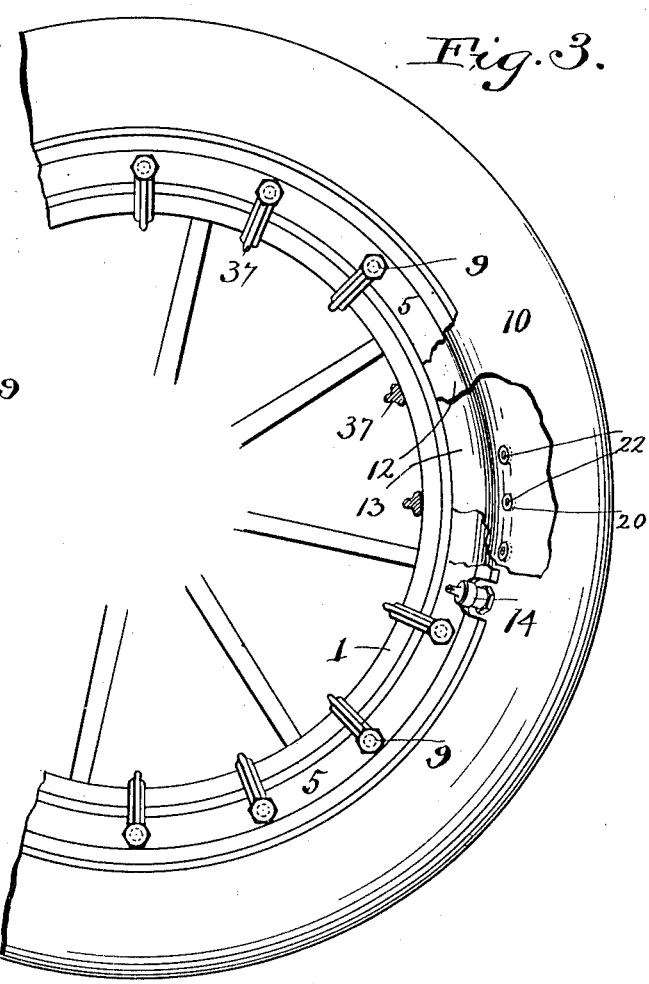
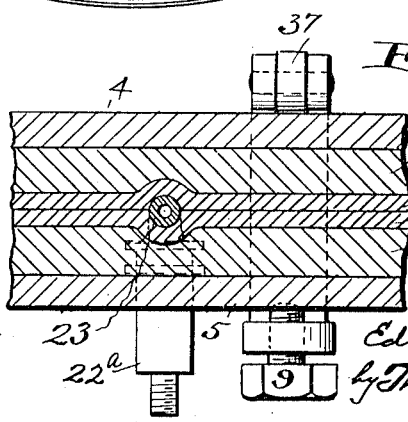
Witnesses
E. B. Gilchrist
H. R. Sullivan
Inventor
Edward Dettelbach
by Thurston & Kwis
Attys

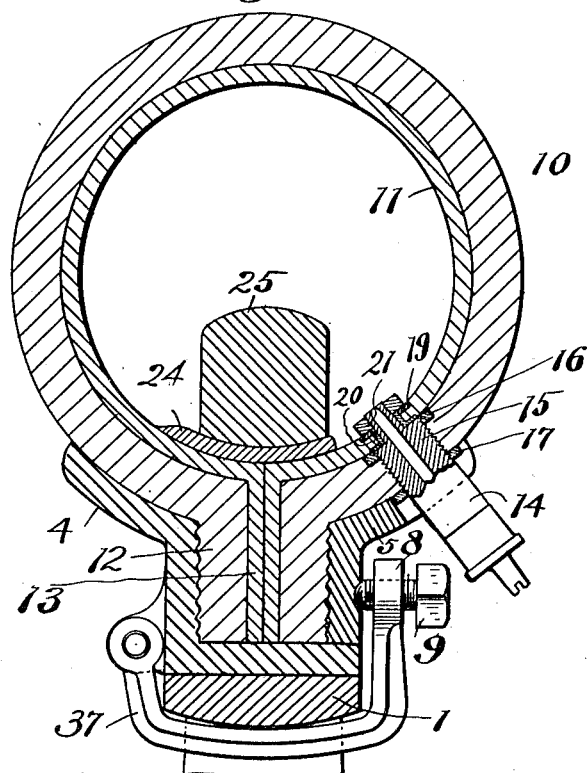

UNITED STATES PATENT OFFICE.

EDWARD DETTELBACH, OF CLEVELAND, OHIO.

TIRE.

1,022,127.

Specification of Letters Patent.  Patented Apr. 2, 1912.

Application filed June 17, 1910. Serial No. 567,377.

*To all whom it may concern:*

Be it known that I, EDWARD DETTELBACH, a citizen of the United States, residing at Cleveland, in the county of Cuyahoga and State of Ohio, have invented a certain new and useful Improvement in Tires, of which the following is a full, clear, and exact description.

My invention relates to tires of the pneumatic type for use upon vehicles and has for its object to provide a tire which may be readily removed from the rim of the wheel, and further, by its construction provides a tire in which punctures are quickly and easily repaired.

A further object of the invention is to provide a tire which cannot completely collapse and thereby prevent the rim of the wheel from riding upon the ground if the tire is punctured.

Generally speaking, the invention comprises the elements and combinations thereof set forth in the accompanying claims.

Reference should be had to the accompanying drawings forming a part of this specification in which—

Figure 1 is a vertical cross section through the tire and rim and felly of a wheel. Fig. 2 is a partial cross section of a modified form of the invention. Fig. 3 is a side elevation of a portion of a wheel showing the form of tire disclosed in Fig. 1, a portion of the outer casing of the tire being removed. Fig. 4 is a section on the line 4—4 of Fig. 2; and Fig. 5 is a vertical cross section of a further modification of the tire and also shows another form of rim clamping means.

Referring to Fig. 1, the felly of a wheel is represented at 1, and a two-part rim is shown mounted upon this felly. The rim comprises two members, one member consisting of an angular part 2 having a base 3 which is secured to the felly, and having the outer part of the portion 2 bent into a curved shape, as represented at 4, for the purpose of engaging the underside of the outer shoe of the tire. The rim is completed by a removable member 5 which is formed with a flange 6 curved in a manner similar to the portion 4 and for the same purpose. Upon the lower part of the portion 2 of the rim is pivoted a clamp 7 which extends beneath the felly of the wheel and is bent to extend parallel with the ends of the rim opposite the part upon which it is pivoted.

The clamp 7 at its free end is formed with a threaded opening 8 through which extends a bolt 9, the end of which bears against the movable rim portion 5. The portion 3 of the rim is secured upon the felly in any well known manner, and further description of this will not be necessary.

The tire itself comprises an outer member or shoe 10 and an inner member 11. The shoe may be formed of any desired material suitable for the purpose, as rubber, canvas or composition.

In forming the shoe, it is made substantially cylindrical in form, except that it is not closed, and at the places upon the inner side of the shoe where the ends would naturally meet, projecting ends 12 are formed which, as shown, are adapted to extend into the space between the fixed portion of the rim and the movable portion.

The inner member of the tire is formed of elastic material preferably rubber or composition thereof, and is made normally to fit closely within the outer member 10 so that when the tire is inflated, the member 11 will be under but very slight, if any, expansion, and will snugly fit the walls of the member 10.

The inner member 11 is not a closed tube, as in the ordinary form of tire, but is formed with free edges at the central inner portion of the tire, which edges have extending portions 13 that are adapted to be held between the portions 12 of the shoe 10, and these associated projecting portions are held between the two parts of the rim, as clearly shown in Fig. 1.

When the bolt 9 is operated to move the portion 5 of the rim toward the other portion of the rim, projecting portions 12 and 13 of the tire members are tightly clamped and there is little, if any, leakage of air which may be contained within the tire.

For the purpose of inflating the tire, a valve 14 is shown which extends through an opening formed in the flange 6 of the movable rim portion 5. This valve is mounted in the outer section 10 of the tire in any suitable manner, as by having the outer body portion screw-threaded, as indicated at 15, and placing a nut in coöperation with said screw threads upon the inner and outer sides of the member 10, as indicated at 16 and 17. The inner end of the valve body 14 is formed with a projection 18 through which the air duct passes and which is of less diameter than the diameter of the body portion of the valve. Coöperating with and surrounding this projection 18 is a thimble 19 which is formed with a groove in its peripheral surface, as clearly indicated at 20. This thimble 19 is held in place by means of a nut 21 which engages with the screw threaded outer end of the projection 18. The thimble 19 is inserted through an opening provided in an appropriate portion of the inner member 11, and the edges of the opening coöperate with the groove 21 in the thimble. There are a plurality of openings arranged in series in the member 11, which are normally plugged up as indicated at 22 in Fig. 3. These holes are substantially the same in size and are each provided with thimbles similar to that indicated at 19, so that the member 18 may coöperate with any selected opening, as the inner member 11 is moved longitudinally with respect to the outer member 10.

If the inner member 11 becomes punctured, the clamp 7 is removed which permits the members 10 and 11 to be removed from the rim and thereby permits access to the interior of the tire. The nut 21 may be removed and the projection 18 upon the air valve removed from the particular opening in the member 11 with which it had previously been associated, whereby the member 11 may be shifted longitudinally, and another opening and its thimble brought into position to coöperate with the projection 18 upon the air valve. The nut 21 will then be replaced, and likewise the projecting portions of the tire will be returned to their position with relation to the rim, and the movable section of the rim be clamped in place. The tire may then be filled with air and the puncture is effectually repaired, for by shifting the punctured portions of the outer and inner members from alinement with each other, and compressing the member 11 against the shoe 10 by the inflation of the tire, the leakage of air is effectually prevented.

A modified form of the invention is shown in Fig. 2, wherein the air valve is shown as projecting through the lower portion of the removable rim section. The air valve 22ª here shown is provided with a nipple 23 extending at right angles with respect to the body portion of the air valve and this nipple extends into the space inclosed by the inner member 11.

Inasmuch as the projecting ends 12 and 31 of the members 10 and 11 are flexible and resilient, these members will be pressed about and firmly inclose the nipple 23 when the movable rim section is pushed inwardly by the clamps in a manner previously described. This construction does away with the necessity for the holes or openings 22 in the member 11 and at the same time permits the longitudinal adjustment of the member 11 with respect to the shoe 10, the same as previously described.

In Fig. 1 is disclosed an arrangement for preventing the complete collapse of the tire should the same become punctured. This construction embodies a strip of material 24 which is cemented or otherwise secured to the inner member 11 of the tire. In width the strip of material is sufficiently wide so as to extend an equal distance upon both sides of the center of the tire. This strip extends throughout the peripheral length of the tire. Secured to this strip is an annular member 25 which may be of rubber, rope or other suitable material and is preferably resilient. This member 25 likewise extends throughout the length of the tire.

It will be apparent that should the tire collapse due to a puncture or leakage from any source, the tire will rest against the member 25 and will thus hold the rim of the wheel from engagement with the ground. This is quite an important feature of the invention, for it is a well known fact that upon the collapse of a tire, the tire flattens out and the rim travels upon the flattened tire, pressing it against the ground. This causes the tire to become cut and seriously damaged. In the construction here proposed, the rim could not bear against the flattened tire upon the ground for the rim is elevated from the ground because of the presence of the member 25.

In Fig. 5 there is shown a modified form of tire which is adapted for use with a resilient wheel of the type there shown. This wheel consists of a hub 26 from which extends radially an annular web member 27. A series of openings or slots, one of which is represented at 28, are formed in this member. Upon the outer portion of the member 27 the fixed or immovable portion of the rim 29 is secured, with which rim portion a removable member 30 coöperates. An annular two part tubular member 31 is formed with inwardly projecting flanges 32 which are secured together by means of bolts 33 extending through the slots 28. The lower or inner ends of these flanges 32 coöperate with the opposite sides of the member 27. The tubular member 31 at its outer portion is secured together by means of bolts 34. One section of the tubular member 31 is formed integral with the rim 35 of the wheel which carries a resilient tread member 36. The walls of the tubular member 31 at their upper point of meeting are spaced apart, as indicated at 37, for the purpose of engaging with an annular rib 38 which is formed upon the outer shoe of the tire. The member 39 shown in Fig. 5 is similar to the outer shoe 10, previously described, with the exception of the rib 38 which is formed at the outer central portion thereof. The inner member 40 is likewise similar to the inner member 11. An alternative means for securing the two-part rim is shown consisting of a series of bolts arranged around the rim, one of such bolts being shown at 41. It will be clearly seen that the tubular member 31 with its co-operating parts is supported entirely upon the tire members 39 and 40, and that this tire forms a resilient connection between the tread and the hub of the wheel.

I wish it understood that various details of construction in the tire and rim may be varied without departing from the spirit of this invention.

Having thus described my invention, what I claim is:

1. A tire comprising an inner cylindrical shaped member having free projecting edges, an outer member cylindrical in shape and having free projecting edges, the said members being longitudinally movable with respect to each other and the projecting edge pieces upon the inner member being held between the projecting pieces upon the outer member, and means for holding them together.

2. A tire comprising an inner and an outer member which members are free to move relatively, the said members being formed from annular strips of material tubular in form but with the edges free, depending portions carried by each of the members at the free edges thereof, and means for securing the depending portions on the inner member between the like portions upon the outer member.

3. A tire comprising an inner and outer member, the outer member being formed of resilient material but substantially non expanding, said member being formed with depending flanges, an inner member being formed of resilient material of a shape to snugly fit within the outer member when the tire is not inflated, said member being formed with depending flanges which extend between the flanges upon the outer member, and means for securing the flanges together.

In testimony whereof, I hereunto affix my signature in the presence of two witnesses.

EDWARD DETTELBACH.

Witnesses:
A. F. KWIS,
A. J. HUDSON.